(12) United States Patent
Morelos-Zaragoza

(10) Patent No.: US 6,804,309 B1
(45) Date of Patent: Oct. 12, 2004

(54) MODULATION FORMAT IDENTIFICATION DEVICE AND METHOD OF SAME

(75) Inventor: Robert Morelos-Zaragoza, Tokyo (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 09/697,539

(22) Filed: Oct. 26, 2000

(30) Foreign Application Priority Data

Oct. 28, 1999 (JP) .......................................... 11-307702

(51) Int. Cl.$^7$ .......................................... H04L 27/22
(52) U.S. Cl. ...................... 375/316; 375/322; 375/340
(58) Field of Search .............................. 375/322, 316, 375/326, 327, 340, 342, 275, 259, 324, 328; 455/84, 93, 142, 102, 133, 134, 135, 141; 370/204, 206, 207, 208, 252

(56) References Cited

U.S. PATENT DOCUMENTS

| | | | | |
|---|---|---|---|---|
| 4,866,395 A | * | 9/1989 | Hostetter ..................... | 329/309 |
| 5,982,819 A | * | 11/1999 | Womack et al. ............. | 375/316 |
| 6,181,734 B1 | * | 1/2001 | Palermo ...................... | 375/219 |
| 6,192,070 B1 | * | 2/2001 | Poon et al. ................... | 275/222 |
| 6,359,934 B1 | * | 3/2002 | Yoshida ....................... | 375/262 |
| 6,452,964 B1 | * | 9/2002 | Yoshida ....................... | 375/222 |
| 6,671,328 B1 | * | 12/2003 | Poon et al. .................. | 375/295 |

* cited by examiner

Primary Examiner—Tesfaldet Bocure
Assistant Examiner—Khanh Cong Tran
(74) Attorney, Agent, or Firm—Frommer Lawrence & Haug LLP; William S. Frommer

(57) ABSTRACT

A modulation format identification device capable of realizing a practical receiver capable of identifying a modulation format of a received signal irrespective of its modulation format by a simple configuration, wherein provision is made of a phase lock detector group having a plurality of detectors provided corresponding to a plurality of modulation formats and with the received signals input in parallel thereto, counting a number of symbols in accordance with the modulation format for every detector, making a primary decision that the received signal has been modulated by the related modulation format when the count exceeds a constant threshold value, and outputting the results as lock detection flags and a logic circuit for exclusively selecting one modulation format upon receipt of the plurality of output results of the phase lock detector group, and a method of the same.

20 Claims, 15 Drawing Sheets

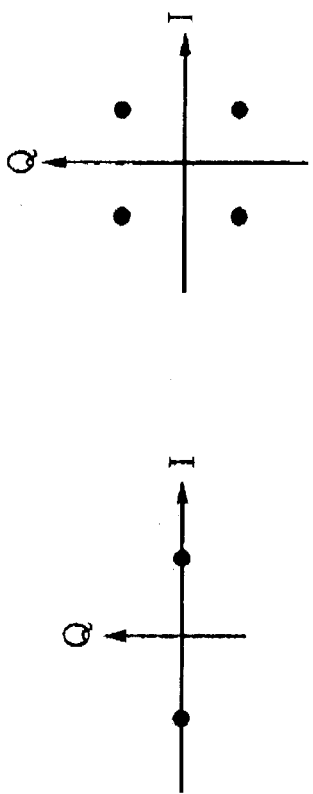
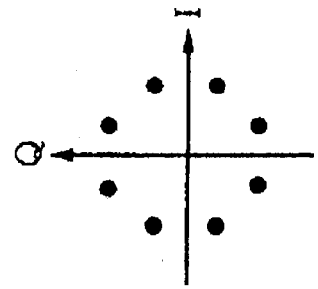
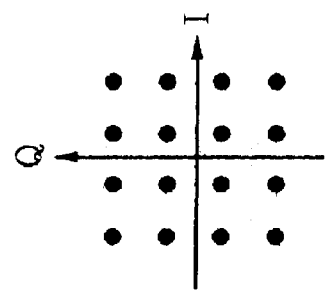
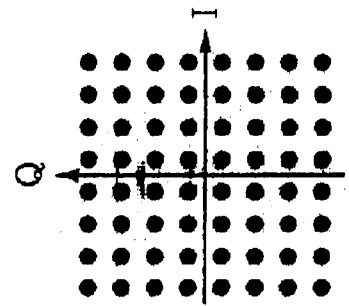
FIG.3A  FIG.3B  FIG.3C  FIG.3D  FIG.3E

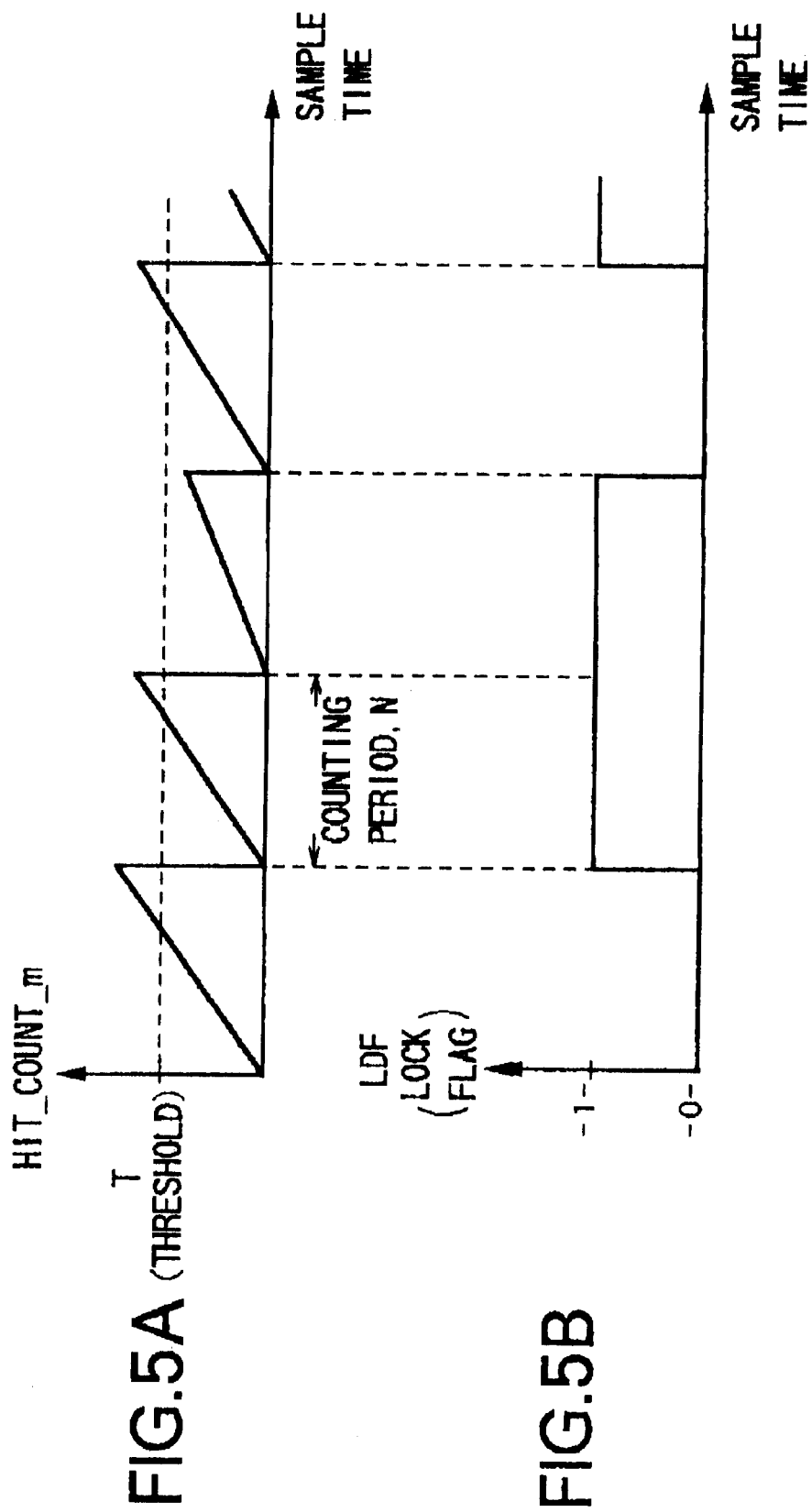

FIG.13

| MODULATION | MINIMUM $E_s/N_0$ |
|---|---|
| BPSK | -8.5 |
| QPSK | 1.0 |
| 8-PSK | 7.0 |
| 16-QAM | 12.5 |
| 64-QAM | 20.0 |

FIG.14

| MODULATION | Es/No RANGE | BPSK ID | QPSK ID | 8-PSK ID | 16-QAM ID | 64-QAM ID |
|---|---|---|---|---|---|---|
| BPSK | From -8.5 | 1 | 0 | 0 | 0 | 0 |
| QPSK | From 1.0 | 0 | 1 | 0 | 0 | 0 |
| 8-PSK | From 7.0 | 0 | 0 | 1 | 0 | 0 |
| 16-QAM | 4.0-10.0 | 0 | 1 | 0 | 0 | 0 |
| | From 12.5 | 0 | 0 | 0 | 1 | 0 |
| 64-QAM | 6.0-19.0 | 0 | 1 | 0 | 0 | 0 |
| | From 20.0 | 0 | 0 | 0 | 0 | 1 |

MODULATION FORMAT IDENTIFICATION DEVICE AND METHOD OF SAME

BACKGROUND OF THE INVENTION

1. Field of the Invention

The present invention relates to a modulation format identification device for identifying a modulation format of a received signal transmitted based on one modulation format among a plurality of different digital modulation formats and a method of the same.

2. Description of the Related Art

Where transmitting symbolized information by an electromagnetic wave (wirelessly), a modulation operation for multiplying a so-called baseband signal with a high frequency sine wave becomes necessary.

The high frequency sine wave to be multiplied with the baseband signal is referred to as a carrier. When precisely expressing this sine wave mathematically, it can be indicated as follows by using the three elements of an amplitude a, an angular frequency $\omega$, and a phase $\theta$.

$$y = a \cdot \cos(\omega t + \theta) \quad (1)$$

As the digital modulation format, by changing one of these three elements of the amplitude a, angular frequency $\omega$, and the phase $\theta$, three basic types of modulation formats can be taken.

Namely, there are the three modulation formats of amplitude shift keying (ASK), frequency shift keying (FSK), and phase shift keying (ASK).

Among these, ASK suffers from a problem in the threshold voltage. FSK can solve this problem of the threshold voltage, but in contrast suffers from a problem in terms of the effective utilization of frequency resources since the occupied band width becomes larger than with ASK.

Contrary to this, in PSK, the same level of occupied band width as ASK can be maintained, the problem of the threshold voltage can be solved, and an error characteristic better than the ASK can be achieved with the same S/N ratio.

In the above basic modulation formats, one bit of digital information is transmitted by using two types of waveforms, but it is not necessary to limit the waveforms used for transmission to two types. It is also possible to send a plurality bits of information at one time by using a plurality of waveforms.

Therefore, a so-called M-ary modulation format for sending a larger amount of information at one time with the same transmission band width is generally used.

As such M-ary modulation formats, corresponding to the basic modulation formats, there are an M-ary amplitude shift keying (M-ASK), an M-ary frequency shift keying (M-FSK), and an M-ary phase shift keying (M-PSK).

Among them, M-ASK is suitable for a system wherein saving of the frequency resources is more important than a transmission signal power, while M-FSK is suitable for a communication system wherein there is leeway in the frequency resources, but there is a strict restriction in the transmission power or the like.

M-PSK is advantageous in comparison with the other modulation formats in terms of the effective utilization of the power and frequency, so has been widely applied to communication systems etc.

In M-PSK, the phase of the carrier to be transmitted is finely controlled. 0 degree and 180 degrees are used in binary PSK, but the phase value is set for every 360°/M in M-ary (M=2, 4, 8, 16, 32, . . . ) PSK. The larger the value of M, the narrower the occupied band width.

Note that the quadrary PSK modulation format in M-PSK is referred to as quadrature PSK (QPSK).

In this M-PSK, a large amount of information can be sent without waste up to the binary, quadrary, and hexary formats, but there is considerable waste when viewed from the signal constellations in 16-ary PSK or higher PSK.

Therefore, there is known the quadrature amplitude modulation (QAM) format designed to enable a large amount of information to be sent without waste in a transmission system restricted in transmission band width by special constellations of the signals.

QAM is an indispensable modulation technique in a system where a large amount of information must be sent with a narrow transmission band width.

Accordingly, in place of for example 16-ary PSK and 32-ary PSK, 16-ary QAM and further 32-ary QAM etc. are used.

Summarizing the problem to be solved by the invention, in recent years, a software-defined radio (SDR) device operating over a wide frequency band and a variety of digital modulation formats such as M-PSK or M-QAM have been proposed (refer to for example J. Mitola, "Software Radio", IEEE Comm. Magazine, May 1995).

In this case, the receiving side must identify the modulation format of the received signal transmitted based on one modulation format among the plurality of different modulation formats.

As the conventional method, there is the method of determining in advance the modulation format of the signal to be received on the receiving side, but there is a problem from the viewpoint of practical use.

Further, as another method, there is a method of automatically identifying the modulation format by using more complex statistics or transformation in the frequency domain by fast fourier transforms (FFT), but there are the disadvantages that the configuration becomes complex etc.

Further, in recent years, a device for identifying the modulation format of the received signal on the receiving side has been proposed, but it has been proposed as a special circuit which can be applied for only the identification of a specific modulation format. No device for identifying the modulation format of the received signal irrespective of the modulation format has ever been proposed.

SUMMARY OF THE INVENTION

An object of the present invention is to provide a modulation format identification device capable of realizing a practical receiver capable of identifying the modulation format of a received signal irrespective of the modulation format by a simple configuration and a method of the same.

According to a first aspect of the present invention, there is provided a modulation format identification device for identifying a modulation format of a received signal transmitted based on one modulation format among a plurality of different modulation formats, comprising a primary decision circuit having a plurality of detectors provided corresponding to the plurality of modulation formats and receiving as input the received signals in parallel thereto, counting a number of symbols in accordance with each modulation format for every detector, making a primary decision that the received signal has been modulated by the related modulation format when a count exceeds a constant threshold value and outputting these decision results from the detectors and a logic circuit for exclusively selecting one modulation format upon receipt of a plurality of output results of the primary decision circuit.

Preferably, in the device of the present invention, each detector comprises a hit counter for counting the number of symbols in each in-lock area designated in advance for exactly a counting period determined in advance and a detection flag generation circuit for comparing the count output from the hit counter and a threshold value set in advance and outputting a detection flag when the number of symbols is larger than the threshold value, and the logic circuit selects one modulation format based on a plurality of detection flags from the detection flag generation circuit.

According to a second aspect of the present invention, there is provided a modulation format identification method for identifying a modulation format of a received signal transmitted based on one modulation format among a plurality of different modulation formats, comprising the steps of counting the number of symbols in accordance with each modulation format and making a primary decision that the received signal has been modulated by the related modulation format when a count exceeds a constant threshold value and exclusively selecting one modulation format upon receipt of a plurality of primary decision results.

Preferably, in the method of the present invention, in the primary decision, counting the number of the symbols in an in-lock area designated in advance for exactly a counting period determined in advance and deciding that the received signal has been modulated by the related modulation format when the count is larger than a threshold value set in advance.

Further, in the device and method of the present invention, preferably the modulation signal is a signal capable of expressing an in-phase component and a quadrature component in an orthogonal coordinate system and having symmetry in the orthogonal coordinate system, and the primary decision is made based on the number of symbols in one quadrant among four quadrants of the quadrature coordinate system.

Further, in the present invention, as the threshold value, preferably a common value is given with respect to the modulation formats.

Further, in the present invention, preferably the threshold value is set in accordance with the channel condition for every modulation format.

According to the present invention, for example a signal modulated by a predetermined modulation format is input to the primary decision circuit.

The primary decision circuit counts the number of symbols of the received signal in accordance with the modulation format for every detector.

Then, this count and a threshold value set in advance are compared. When the result is that the count exceeds a constant threshold value, it is primarily decided that the received signal has been modulated by the related modulation format.

The result of the primary decision of the detectors is input to the logic circuit.

Then, the logic circuit selects one modulation format exclusively from among a plurality of primary decision results.

BRIEF DESCRIPTION OF THE DRAWINGS

These and other objects and features of the present invention will become clearer from the following description of the preferred embodiments given with reference to the accompanying drawings, in which:

FIGS. 3A to 3E are views of constellations of signal points expressing in-phase components IC and quadrature components QC of signals in BPSK, QPSK, 8PSK, 16-QAM, and 64-QAM in orthogonal coordinates;

FIGS. 5A and 5B are views of the relationship between a counting period N and a threshold value T;

FIG. 13 is a view of the minimum symbol signal to noise ratio (SNR) required for reaching the threshold value given to each phase lock detector;

FIG. 14 is a view of the results of simulation for the identification circuit according to the present invention.

DESCRIPTION OF THE PREFERRED EMBODIMENTS

Figure 1:
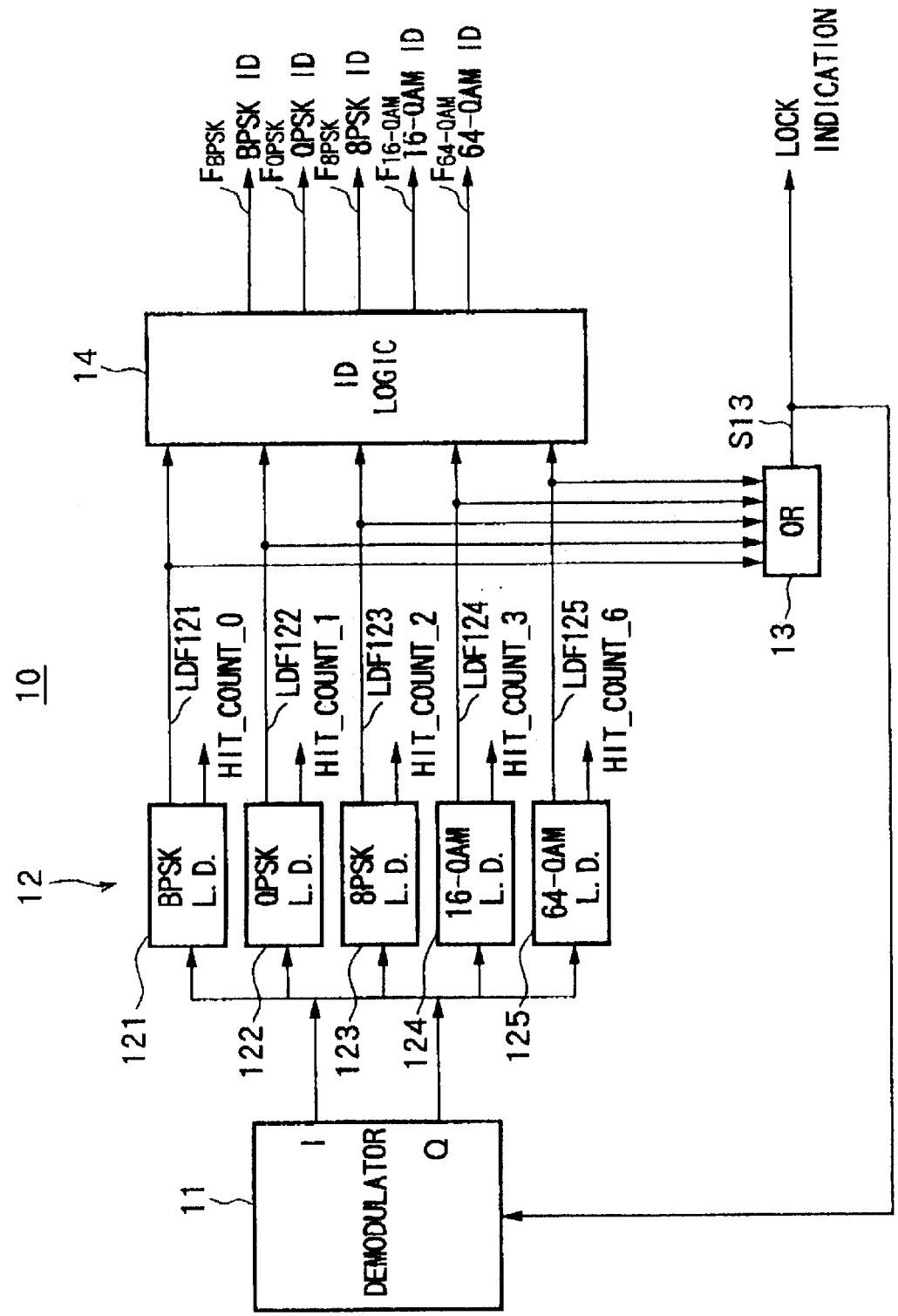
FIG. 1 is a view of an embodiment of the system configuration of a modulation format identification device according to the present invention.

Below, an explanation will be made of embodiments of the present invention by referring to the drawings.

FIG. 1 is a view of an embodiment of the system configuration of a modulation format identification device according to the present invention.

In FIG. 1, an example of a modulation format identification device for identifying the modulation format of a signal modulated based on five digital modulation formats is shown.

The five modulation formats are three M-PSK modulation formats and two M-QAM modulation formats, i.e., concretely, for example the modulation formats of BPSK, QPSK, 8-PSK, 16-QAM, and 64-QAM.

Further, this modulation format identification device 10 employs lock detection eliminating frequency offset by a relatively precise frequency scan.

This modulation format identification device 10 comprises, as shown in FIG. 1, a demodulator 11, a phase lock detector group 12 serving as the primary decision circuit, an OR gate 13, and an identification circuit 14 serving as a final decision logic circuit.

The demodulator 11 operates in an acquisition mode when a lock identification signal S13 constituted by the output of the OR gate 13 has an inactive logic "0", operates in a tracking mode when the lock identification signal S13 has an active logic "1", and outputs a so-called in-phase component IC and quadrature component QC obtained by demodulating the received signal to the phase lock detector group 12.

The demodulator 11 performs processing for restoration of the frequency, phase, and timing upon receipt of a received signal transmitted modulated based on one modulation format of BPSK, QPSK, 8-PSK, 16-QAM, or 64-QAM in the acquisition mode. In this acquisition mode, a so-called feedback loop is in an open state.

Further, the demodulator 11 acquires a precise timing in the tracking mode. The feedback loop is in a closed state at this time.

The phase lock detector group 12 comprises phase lock detectors 121, 122, 123, 124, and 125 to which the in-phase components IC and the quadrature components QC of the received signals demodulated at the demodulator 11 are input in parallel and provided corresponding to the five modulation formats, counts the number of symbols in an in-lock area designated in advance in a signal modulated by a predetermined modulation format for exactly a counting period N determined in advance for every modulation format, and outputs a lock detection flag LDF12 of the logic "1" to the OR gate 13 and the identification circuit 14 regarding that the predetermined modulation format can be synchronously detected (hit) where the count is the threshold value T set in advance or more.

In this phase lock detector group 12, a plurality of phase lock detectors may sometimes simultaneously hit.

Namely, the phase lock detector group 12 identifies the modulation format by counting the number of symbols for every modulation format and making a primary decision that there is a high possibility that the received signal has been modulated by the related modulation format when a count exceeds the constant threshold value.

Figure 2:
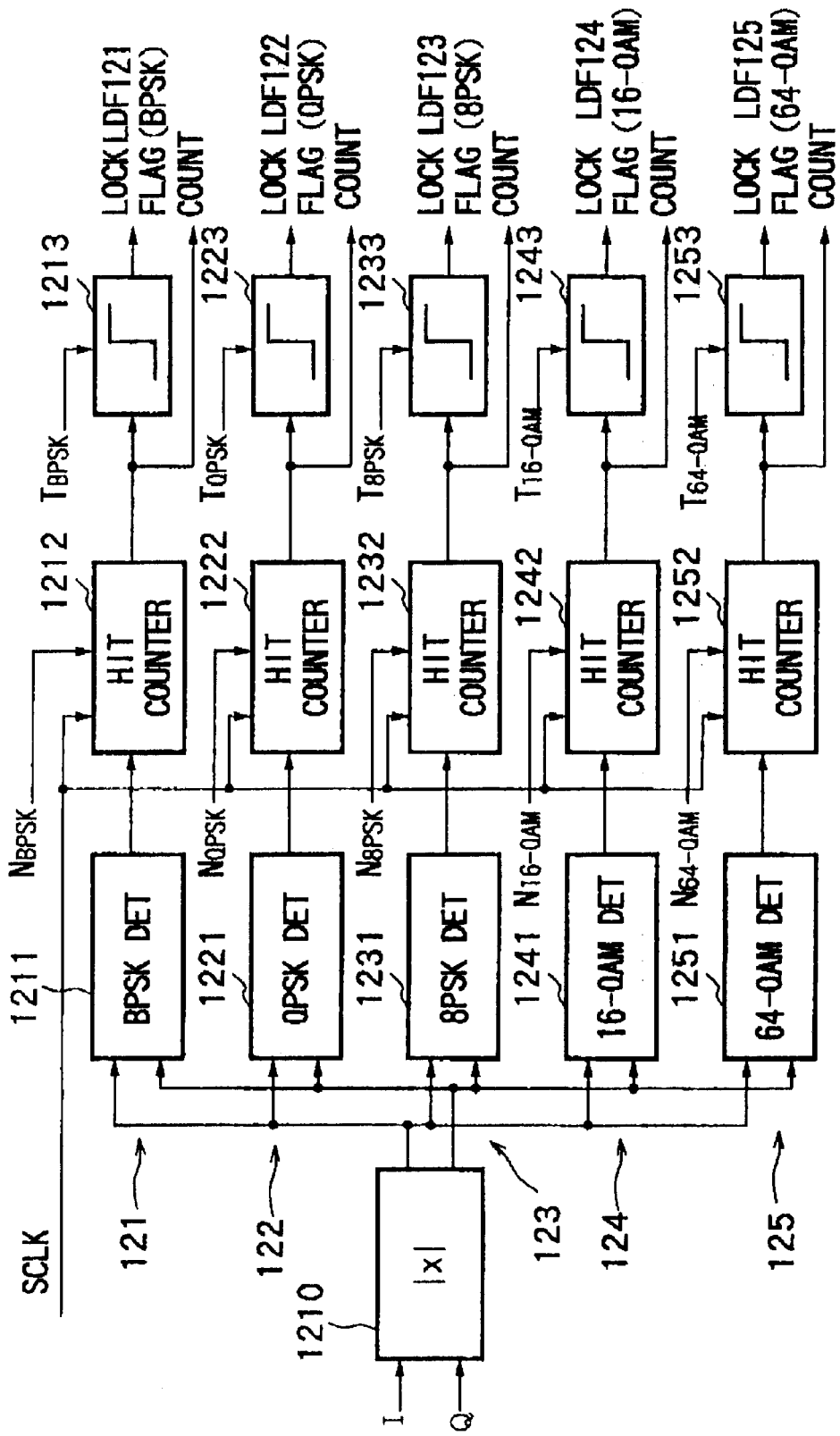
FIG. 2 is a block diagram of an example of the concrete configuration of a phase lock detector group according to the present invention.

FIG. 2 is a block diagram of an example of the concrete configuration of the phase lock detector group 12.

A phase lock detector 121 is provided for the BPSK format and has a BPSK detector 1211, a hit counter 1212, and a lock detector flag generation circuit 1213 as shown in FIG. 2.

The BPSK detector 1211 detects the BPSK symbols upon receipt of the in-phase component IC and the quadrature component QC of the received signal by an absolute value circuit 1210 and outputs the same to the hit counter 1212.

The hit counter 1212 counts the number of symbols in an in-lock area designated in advance among symbols output from the BPSK detector 1211 for exactly a counting period $N_{BPSK}$ determined in advance synchronous to a symbol clock SCLK and outputs the count to the lock detection flag generation circuit 1213.

The lock detection flag generation circuit 1213 compares the number of symbols in the in-lock area designated in advance of the BPSK modulated signal by the hit counter 1212 and a threshold value $T_{BPSK}$ set in advance and outputs a lock detection flag LDF121 of the logic "1" to the OR gate 13 and the identification circuit 14 when the number of symbols is larger than the threshold value $T_{BPSK}$.

A phase lock detector 122 is provided for the QPSK format and has a QPSK detector 1221, a hit counter 1222, and a lock detector flag generation circuit 1223 as shown in FIG. 2.

The QPSK detector 1221 detects the QPSK symbols upon receipt of the in-phase component IC and the quadrature component QC of the received signal by the absolute value circuit 1210 and outputs the same to the hit counter 1222.

The hit counter 1222 counts the number of symbols in the in-lock area designated in advance among symbols output from the QPSK detector 1221 for exactly a counting period $N_{QPSK}$ determined in advance synchronous to the symbol clock SCLK and outputs the count to the lock detection flag generation circuit 1223.

The lock detection flag generation circuit 1223 compares the number of symbols in the in-lock area designated in advance of the QPSK modulated signal by the hit counter 1222 and a threshold value $T_{QPSK}$ set in advance and outputs a lock detection flag LDF122 of the logic "1" to the OR gate 13 and the identification circuit 14 when the number of symbols is larger than the threshold value $T_{QPSK}$.

A phase lock detector 123 is provided for the 8PSK format and has a 8PSK detector 1231, a hit counter 1232, and a lock detector flag generation circuit 1233 as shown in FIG. 2.

The 8PSK detector 1231 detects the SPSK symbols upon receipt of the in-phase component IC and the quadrature component QC of the received signal by the absolute value circuit 1210 and outputs the same to the hit counter 1232.

The hit counter 1232 counts the number of symbols in the in-lock area designated in advance among symbols output from the 8PSK detector 1231 for exactly a counting period $N_{8PSK}$ determined in advance synchronous to the symbol clock SCLK and outputs the count to the lock detection flag generation circuit 1233.

The lock detection flag generation circuit 1233 compares the number of symbols in the in-lock area designated in advance of the 8PSK modulated signal by the hit counter 1232 and a threshold value $T_{8PSK}$ set in advance and outputs a lock detection flag LDF123 of the logic "1" to the OR gate 13 and the identification circuit 14 when the number of symbols is larger than the threshold value $T_{8PSK}$.

A phase lock detector 124 is provided for the 16-QAM format and has a 16-QAM detector 1241, a hit counter 1242, and a lock detector flag generation circuit 1243 as shown in FIG. 2.

The 16-QAM detector 1241 detects the 16-QAM symbols upon receipt of the in-phase component IC and the quadrature component QC of the received signal by the absolute value circuit 1210 and outputs the same to the hit counter 1242.

The hit counter 1242 counts the number of symbols in the in-lock area designated in advance among symbols output from the 16-QAM detector 1241 for exactly a counting period $N_{16QAM}$ determined in advance synchronous to the symbol clock SCLK and outputs the count to the lock detection flag generation circuit 1243.

The lock detection flag generation circuit 1243 compares the number of symbols in the in-lock area designated in advance of the 16-QAM modulated signal by the hit counter 1242 and a threshold value $T_{16QAM}$ set in advance and outputs a lock detection flag LDF124 of the logic "1" to the OR gate 13 and the identification circuit 14 when the number of symbols is larger than the threshold value $T_{16QAM}$.

A phase lock detector 125 is provided for the 64-QAM format and has a 64-QAM detector 1251, a hit counter 1252, and a lock detector flag generation circuit 1253 as shown in FIG. 2.

The 64-QAM detector 1251 detects the 64-QAM symbols upon receipt of the in-phase component IC and the quadrature component QC of the received signal by the absolute value circuit 1210 and outputs the same to the hit counter 1252.

The hit counter 1252 counts the number of symbols in the in-lock area designated in advance among symbols output from the 64-QAM detector 1251 for exactly a counting period $N_{64QAM}$ determined in advance synchronous to the symbol clock SCLK and outputs the count to the lock detection flag generation circuit 1253.

The lock detection flag generation circuit 1253 compares the number of symbols in the in-lock area designated in advance of the 64-QAM modulated signal by the hit counter 1252 and a threshold value $T_{64QAM}$ set in advance and outputs a lock detection flag LDF125 of the logic "1" to the OR gate 13 and the identification circuit 14 when the number of symbols is larger than the threshold value $T_{64QAM}$.

Here, an explanation will be made of the counting period N for the hit counter and the threshold value T of the lock detection flag generation circuit with reference to the drawings.

FIGS. 3A to 3E are views of the constellations of signal points expressing the in-phase components IC and the quadrature components QC of signals in BPSK, QPSK, 8PSK, 16-QAM, and the 64-QAM in orthogonal coordinates.

FIG. 3A shows the signal point constellations in BPSK, FIG. 3B shows the signal point constellations in QPSK, FIG. 3C shows the signal point constellations in 8PSK, FIG. 3D shows the signal point constellations in 16-QAM, and FIG. 3E shows the signal point constellations in 64-QAM.

Except for general loss, the signal point constellations can be considered to be symmetric with respect to an in-phase axis I and a quadrature axis Q in the in-phase and quadrature planes.

Accordingly, given the constellation of the first quadrant (I>0, Q>0) in the orthogonal coordinate system, the constellations of the other quadrants (second, third, and fourth quadrants) can be obtained by simple reflections with respect to the in-phase axis I and/or the quadrature axis Q.

For this reason, in the present embodiment, the in-phase component IC and the quadrature component QC by the demodulator 11 are input to the detectors 211, 1221, 12341, 1241, and 1251 through a circuit (|x|) 1210.

By this, simplification of the device is realized.

Further, the size of a look up table (LUT) which becomes necessary for the determination of the phase lock can be reduced, and only the size of the channel sample of the input in-phase component IC and quadrature component QC to be processed becomes necessary.

This is because, in a case of an additive white Gaussian noise (AWGN) channel or a Rayleigh fading channel, the noise can be estimated to be spherically symmetric.

Then, in the phase lock detectors 121 to 125, two modulation signal spaces in the in-lock area and non-lock area are given while sectioned.

As mentioned above, lock detection is established by the number of symbols of the received signal in the designated in-lock area.

Then, the appearances of the received symbols in this in-lock area is counted at the hit counter as the "hits" mentioned above.

In the present embodiment, due to the symmetry of the signal point constellations, the processing is carried out by just the magnitudes of the received in-phase component IC and quadrature component QC.

FIGS. 4A to 4E are views of the in-lock areas in BPSK, QPSK, 8PSK, 16-QAM, and 64-QAM.

Figure 4A:
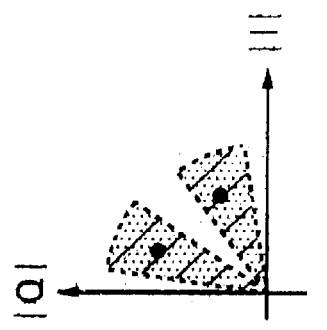
FIGS. 4A to 4E are views of in-lock areas in BPSK, QPSK, 8PSK, 16-QAM, and 64-QAM.
Figure 4B:
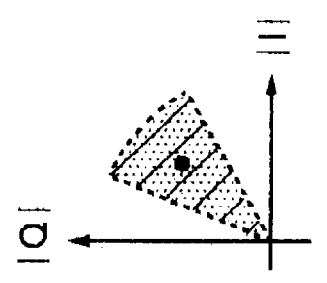
Figure 4C:
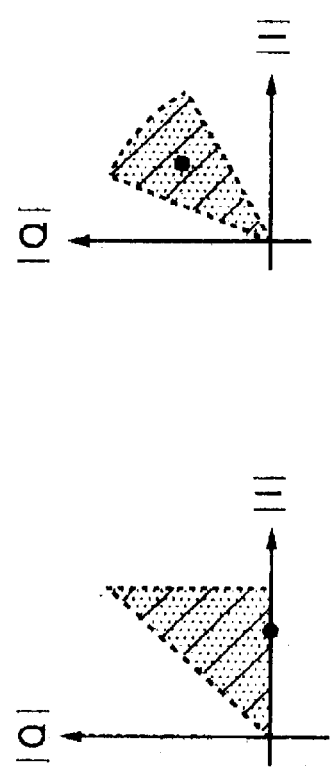
Figure 4D:
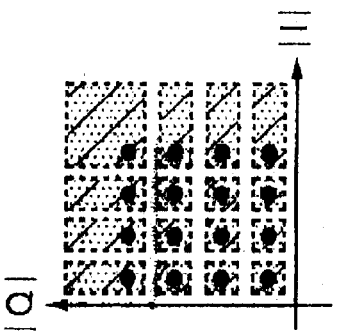
Figure 4E:
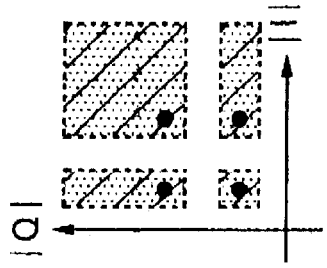

In FIGS. 4A to 4E, the hatched regions surrounded by broken lines are in-lock areas. FIG. 4A shows an in-lock area in BPSK, FIG. 4B shows an in-lock area in QPSK, FIG. 4C shows an in-lock area in 8PSK, FIG. 4D shows an in-lock area in 16-QAM, and FIG. 4E shows an in-lock area in 64-QAM In the view of the signal point constellations in M-QAM, the values of the in-phase axis I and the quadrature axis Q are normalized with respect to an average energy of the signal point constellations. This means an ideal automatic gain control (AGC) stage in a receiver.

Note that, in the M-PSK signal point constellations, the in-lock area corresponds to the decision region in 2M-PSK modulation.

Accordingly, the probability of a symbol not in the lock area of M-PSK is almost asymptotic to the probability of symbol error in 2M-PSK.

Similarly, the in-lock area in the signal point constellations in M-QAM corresponds to the decision region of 4M-QAM.

This will be analyzed in further detail below by assuming transmission on the AWGN channel.

A probability PL of a received symbol appearing in the in-lock area is given by the following equation:

$$PL = 1 - PNL \quad (2)$$

As mentioned above, the in-lock area for M-PSK modulation corresponds to the decision region in detection for every symbol of 2M-PSK modulation.

Accordingly, in M-PSK modulation, a probability PNL of a received symbol not in the lock area is the same as the probability of the symbol error in 2M-PSK modulation and asymptotic as in the following equation:

$$P_{NL} \approx 2Q\left(\sin\left(\frac{\pi}{2M}\right)\sqrt{\frac{2E_S}{N_0}}\right) \quad (3)$$

Here, Q is a Gaussian Q function given by the following equation:

$$Q(x) \triangleq \frac{1}{\sqrt{2\pi}} \int_x^\infty e^{-\frac{u^2}{2}} du \quad (4)$$

For example, in the signal point constellations of square M-QAM of $M=2^{2m}$ and $m \geq 2$, the in-lock area is the same as the decision region of 4M-QAM. Accordingly, the probability PNL of a received symbol not in the lock area becomes as in the following equations:

$$P_{NL} \approx 1 - \left(1 - P_{\sqrt{4M}}\right)^2 = \left(1 - P_{\sqrt{4M}}\right)^2 \quad (5)$$

$$P_{\sqrt{4M}} = 2\left(1 - \frac{1}{\sqrt{4M}}\right)Q\left(\sqrt{\frac{3E_{ave}}{(4M-1)N_0}}\right) \quad (6)$$

Note that, similar equations are obtained also in non-square M-QAM of $M=2^{2m+1}$ and $m \geq 2$.

Further, the counting period N given to the hit counter and the threshold value T given to the lock detection flag generation circuit are designated as parameters.

In general, the threshold value T takes a plurality of values and is given as $T_{M\text{-}PSK}$ in M-PSK modulation and given as $T_{M\text{-}QAM}$ in M-QAM modulation.

Note that, as will be mentioned later, the threshold value T is set at for example 0.55N in both of M-PSK modulation and M-QAM modulation according to the results of computer simulation.

FIGS. 5A and 5B are views of the relationship between the counting period N and the threshold value T.

As shown in FIGS. 5A and 5B, the lock detection flag LDF is set at the logic "1" for a period where for example the number of hits of the received symbols after an elapse of the counting period N exceeds the threshold value T.

The value of this lock detection flag is kept up to the end of the next counting period.

Further, each hit counter is reset and repeats the count processing for every start of the counting period.

The OR gate 13 takes an OR logic of a plurality of (five in the present embodiment) lock detection flags LDF121 to LDF125 output from the phase lock detector group 12 and outputs the result thereof as the lock identification signal S13 to the demodulator 11 and a not illustrated processing circuit etc.

The identification circuit 14 exclusively selects only one modulation format by using the logic circuit upon receipt of a plurality of (five in the present embodiment) lock detection flags LDF121 to LDF125 output from the phase lock detector group 12 capable of taking the logic "1" among a plurality of flags.

Figure 6:
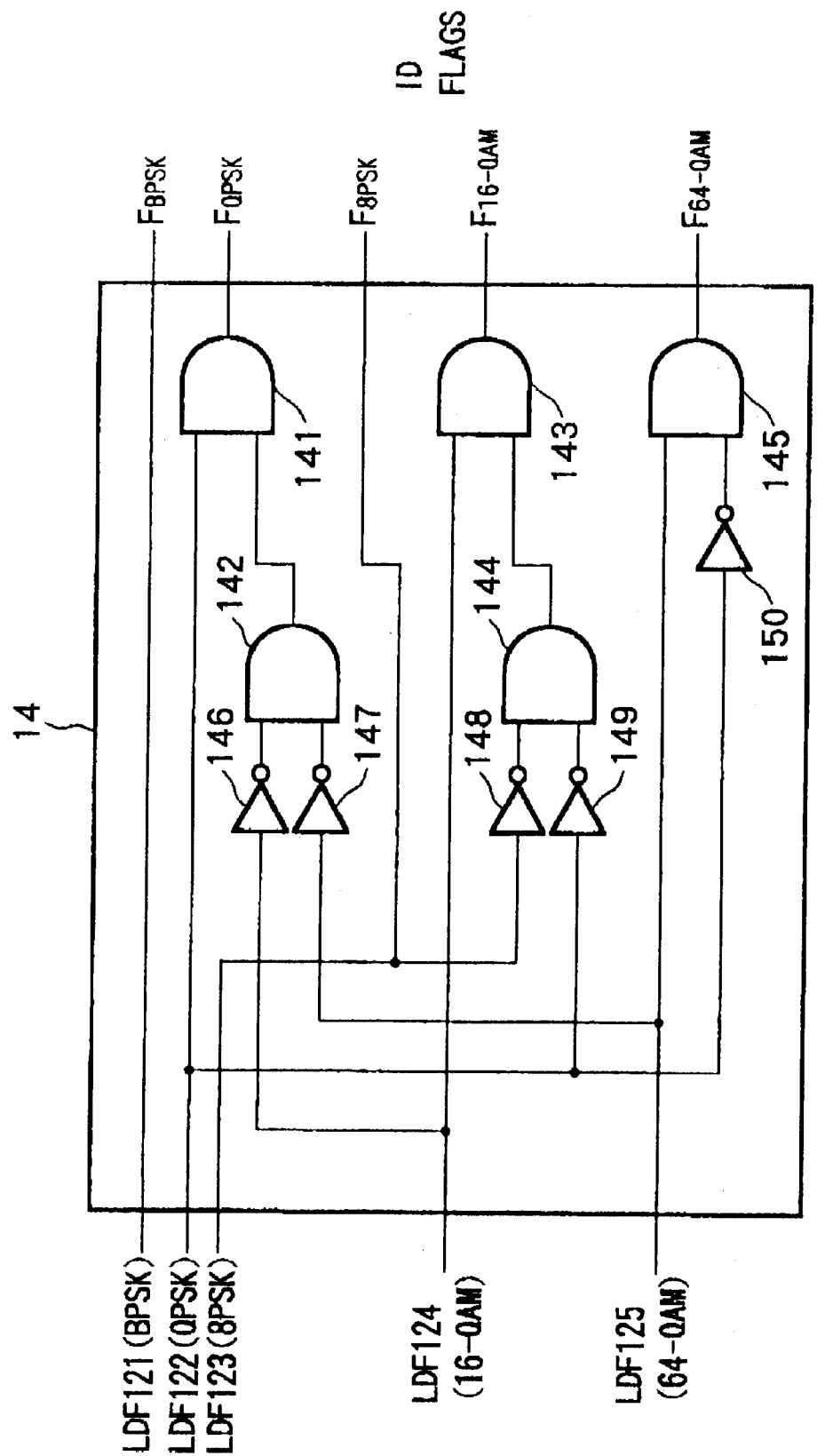
FIG. 6 is a circuit diagram of an example of the concrete configuration of an identification circuit according to the present invention.

FIG. 6 is a circuit diagram of an example of the concrete configuration of the identification circuit 14.

This identification circuit 14 is configured by, as shown in FIG. 6, 2-input AND gates 141 to 145 and inverters 146 to 150.

In the identification circuit 14, the lock detection flag LDF121 indicating a hit of BPSK is the input signal itself output as is as an identification flag FBPSK.

In the identification circuit 14, the lock detection flag LDF122 indicating a hit of QPSK is supplied to one input terminal of the AND gate 141. Further, the output signal of the AND gate 142 is supplied to the other input terminal of the AND gate 141.

The output signal of the inverter 146 is supplied to one input terminal of the AND gate 142, and the output signal of the inverter 147 is supplied to the other input terminal of the AND gate 142. Then, the lock detection flag LDF124 indicating a hit of 16-QAM is supplied to the input terminal of the inverter 146, and the lock detection flag LDF125 indicating a hit of 64-QAM is supplied to the input terminal of the inverter 147, Further, in the identification circuit 14, the lock detection flag LDF123 indicating a hit of 8PSK is the input signal output as is as an identification flag $F_{8PSK}$ and is supplied to the input terminal of the inverter 148.

Further, in the identification circuit 14, the lock detection flag LDF124 indicating a hit of 16-QAM is supplied to one input terminal of the AND gate 143. Further, the output signal of the AND gate 144 is supplied to the other input terminal of the AND gate 143.

One input terminal of the AND gate 144 is supplied with the output signal of the inverter 148, while the other input terminal is supplied with the output signal of the inverter 149. Then, the lock detection flag LDF122 indicating a hit of QPSK is supplied to the input terminal of the inverter 149.

Further, in the identification circuit 14, the lock detection flag LDF125 indicating a hit of 64-QAM is supplied to one input terminal of the AND gate 145. Further, the output signal of the inverter 150 is supplied to the other input terminal of the AND gate 145.

Then, the lock detection flag LDF122 indicating a hit of QPSK is supplied to the input terminal of the inverter 150.

In this identification circuit 14, QPSK is identified when the lock detection flags LDF124 and LDF125 indicating a hit of 16-QAM and 64-QAM have the logic "0" (when they are not hits) and the lock detection flag LDF122 indicating a hit of QPSK has the logic "1".

Further, in the identification circuit 14, 16-QAM is identified when the lock detection flags LDF122 and LDF123 indicating hits of QPSK and 8PSK have the logic "0" (when they are not hits) and the lock detection flag LDF124 indicating a hit of 16-QAM has the logic "1".

Further, in the identification circuit 14, 64-QAM is identified when the lock detection flag LDF122 indicating a hit of QPSK has the logic "0" (when it is not a hit) and the lock detection flag LDF125 indicating a hit of 64-QAM has the logic "1".

Next, an explanation will be given of the operation by the above configuration.

First, a signal modulated by one modulation format among BPSK, QPSK, 8PSK, 16-QAM, and 64-QAM is received at the demodulator 11 from a not illustrated transmission system.

The demodulator 11 operates in the acquisition mode since the lock identification signal S13 of the output of the OR gate 13 is supplied with the inactive logic "0" at this time.

In this acquisition mode, upon receipt of a received signal transmitted modulated based on one modulation format among BPSK, QPSK, SPSK, 16-QAM, and 64-QAM, the demodulator 11 performs processing for restoration of the frequency, phase, and timing and outputs the result to the phase lock detector group 12. Note that, in this acquisition mode, the so-called feedback loop is in the open state.

In the phase lock detector group 12, the in-phase component IC and the quadrature component QC of the received signal demodulated at the demodulator 11 are input in parallel to the phase lock detectors 121, 122, 123, 124, and 125.

Then, the number of symbols in the in-lock area designated in advance of the signal modulated by the predetermined modulation format is counted for exactly the counting period N determined in advance for each of the phase lock detectors 121, 122, 123, 124, and 125.

When the result of the count is that the count is the threshold value T set in advance or more, it is regarded that the predetermined modulation format could be synchronously detected (hit) and the lock detection flags LDF121 to LDF125 of the logic "1" are generated and output to the OR gate 13 and the identification circuit 14. At this time, a plurality of phase lock detectors may sometimes simultaneously hit.

Due to this, the phase identification signal S13 of the output of the OR gate 13 is supplied to the demodulator 11 with the active logic "1". Along with this, the demodulator 11 operates in the tracking mode.

In the demodulator 11, in the tracking mode, a precise timing is obtained. The feedback loop becomes the closed state at this time.

Then, the identification circuit 14 receives a plurality of (five in the present embodiment) lock detection flags LDF121 to LDF125 output from the phase lock detector group 12 capable of taking the logic "1" among the plurality of flags and exclusively selects only one modulation format by using the logic circuit.

Next, a modulation format identification device 10 having the above configuration will be considered based on the results of simulation.

Figure 7:
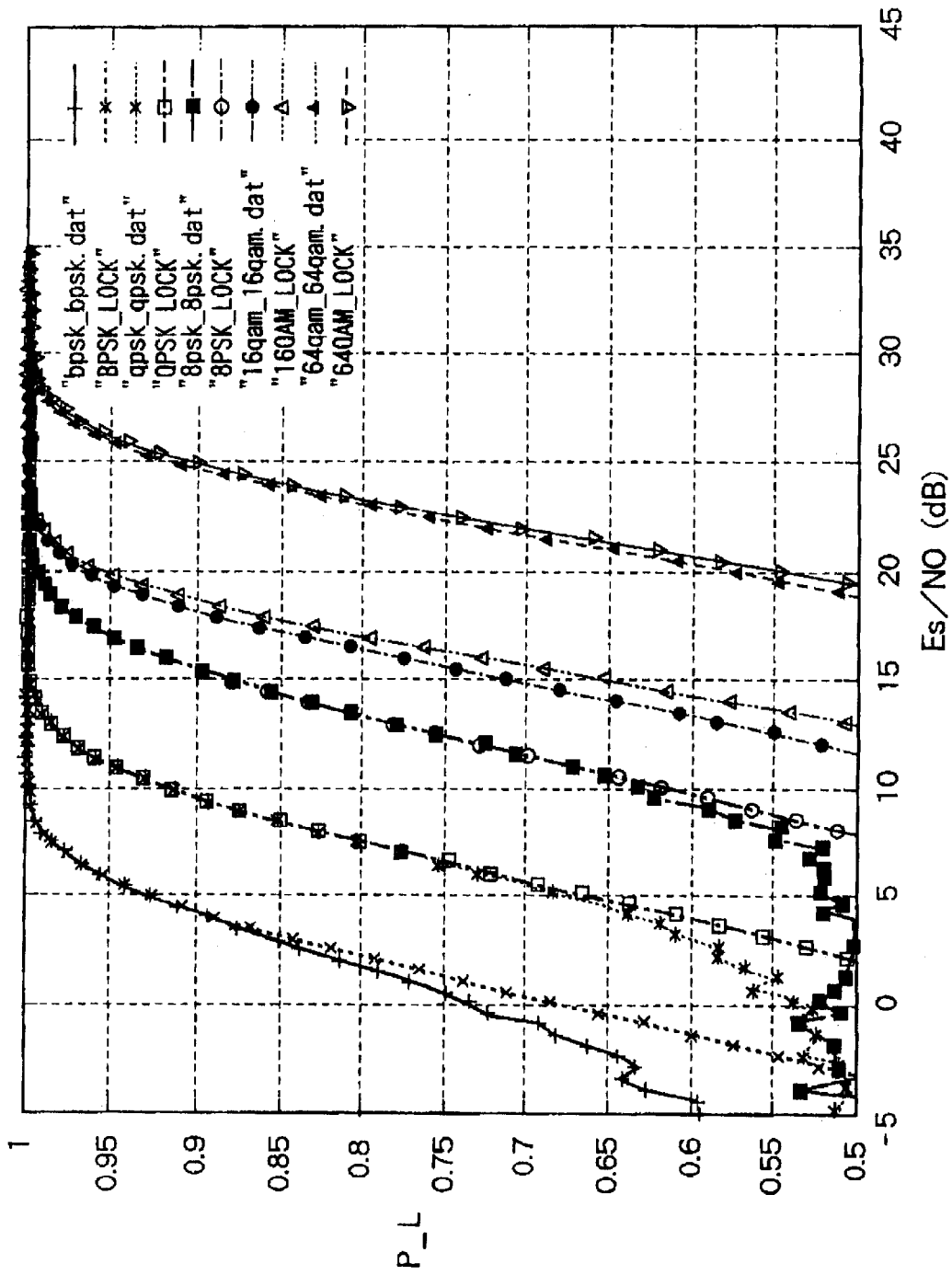
FIG. 7 is a view of the results of simulation of a phase lock detector group according to the present invention and results obtained by evaluating equations (2) to (6)
Figure 8:
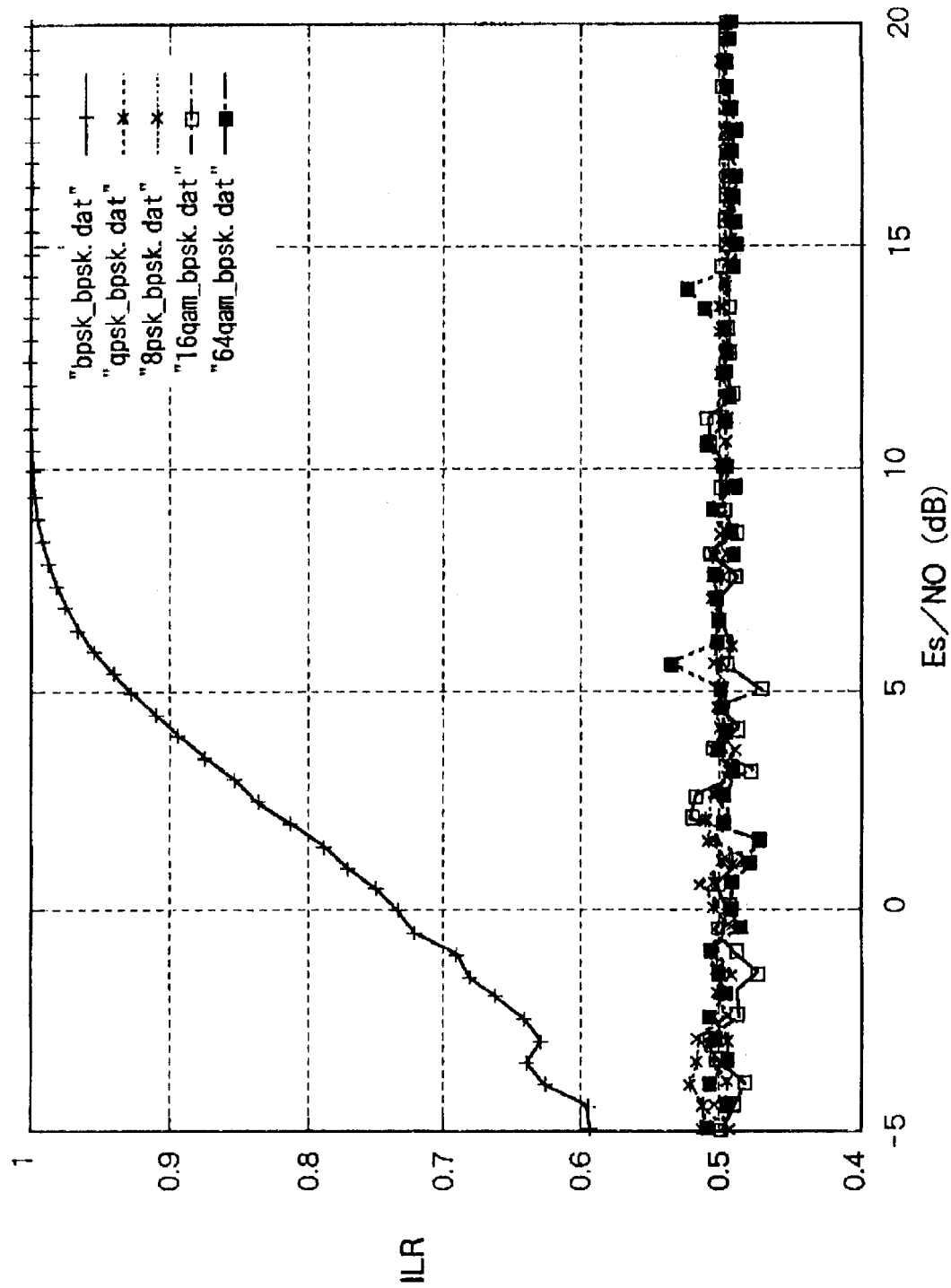
FIG. 8 is a view of the results of simulation of a phase lock detector for BPSK according to the present invention.
Figure 9:
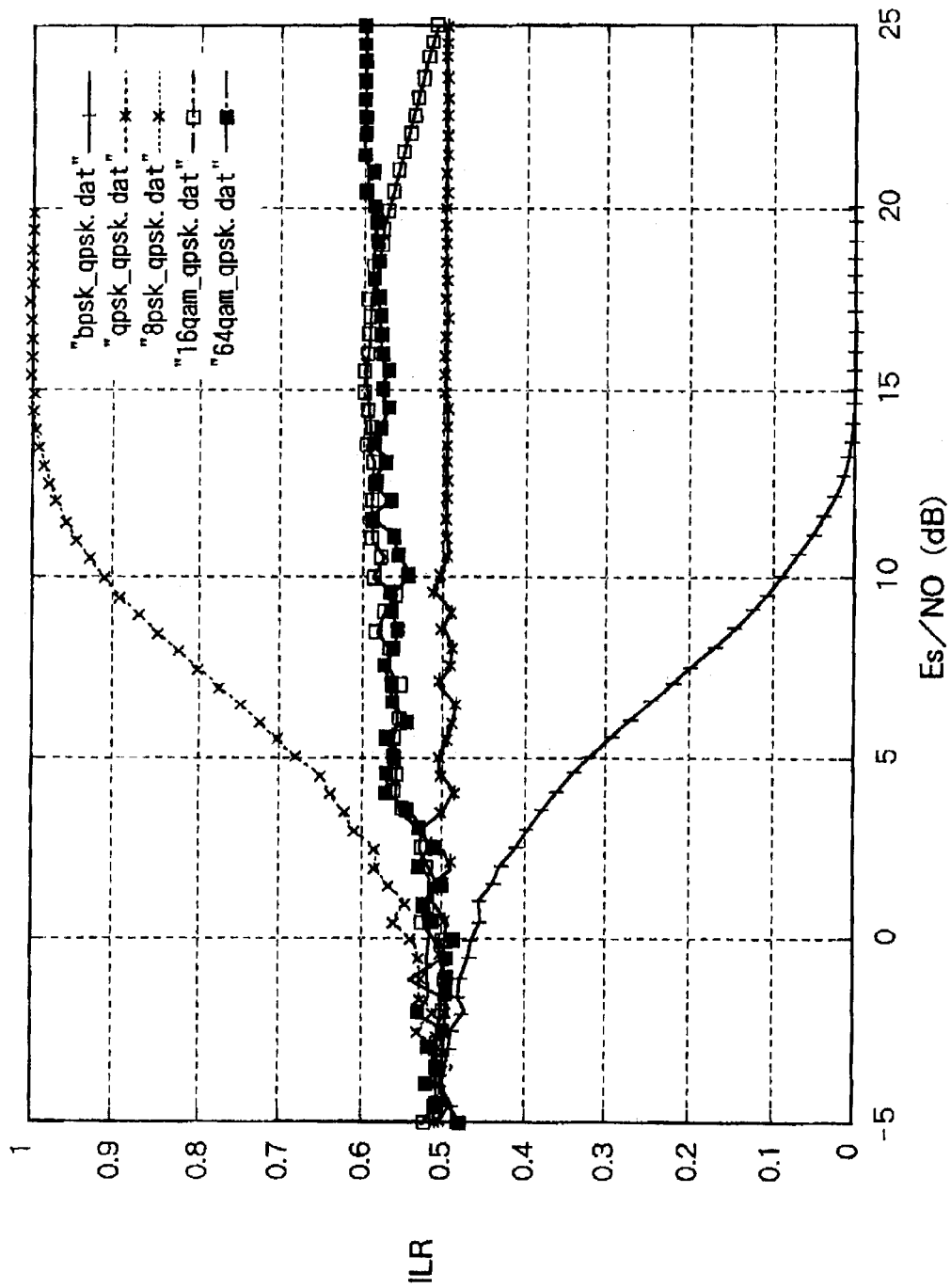
FIG. 9 is a view of the results of simulation of a phase lock detector for QPSK according to the present invention.
Figure 10:
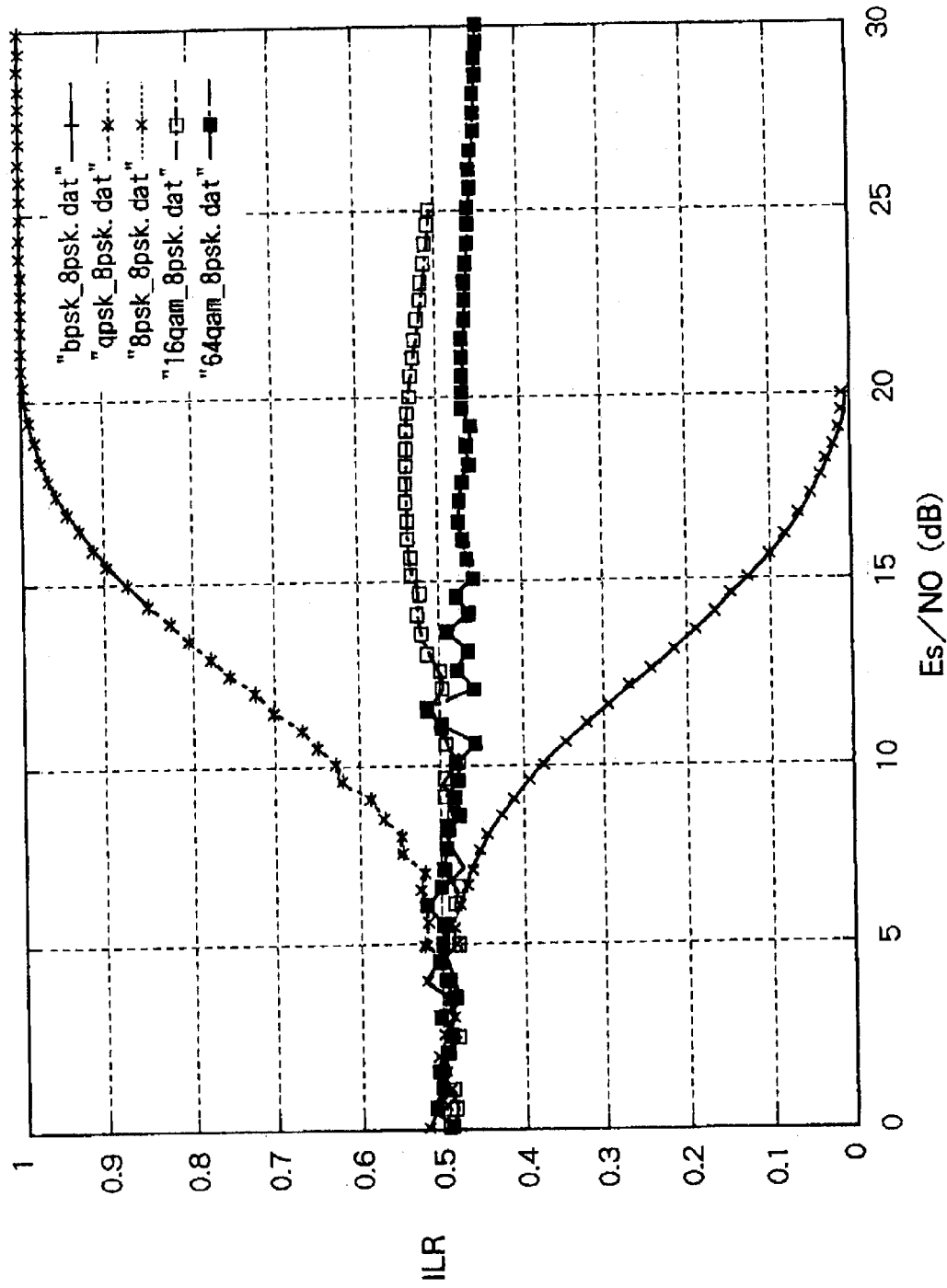
FIG. 10 is a view of the results of simulation of a phase lock detector for 8PSK according to the present invention.
Figure 11:
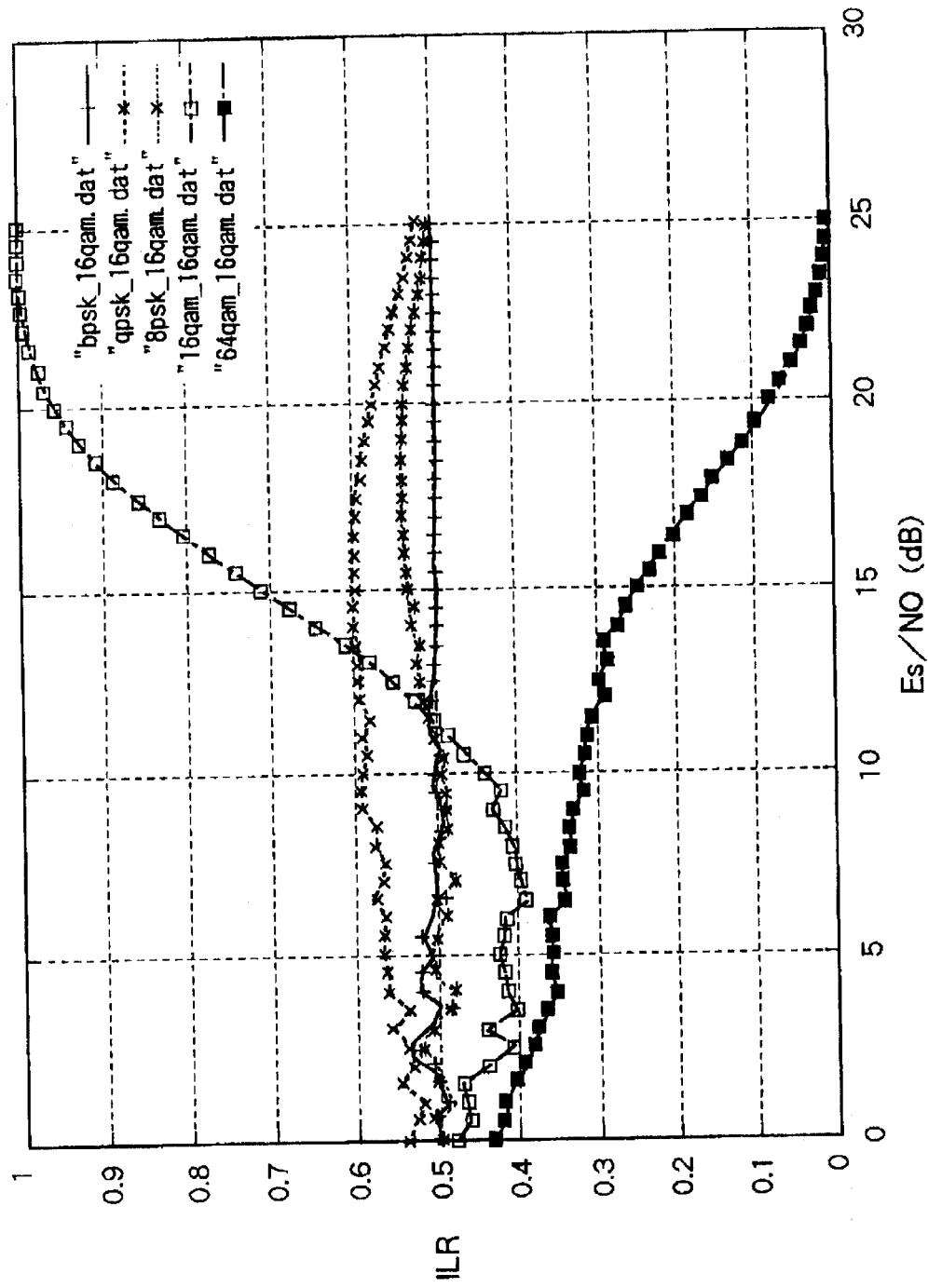
FIG. 11 is a view of the results of simulation of a phase lock detector for 16-QAM according to the present invention.
Figure 12:
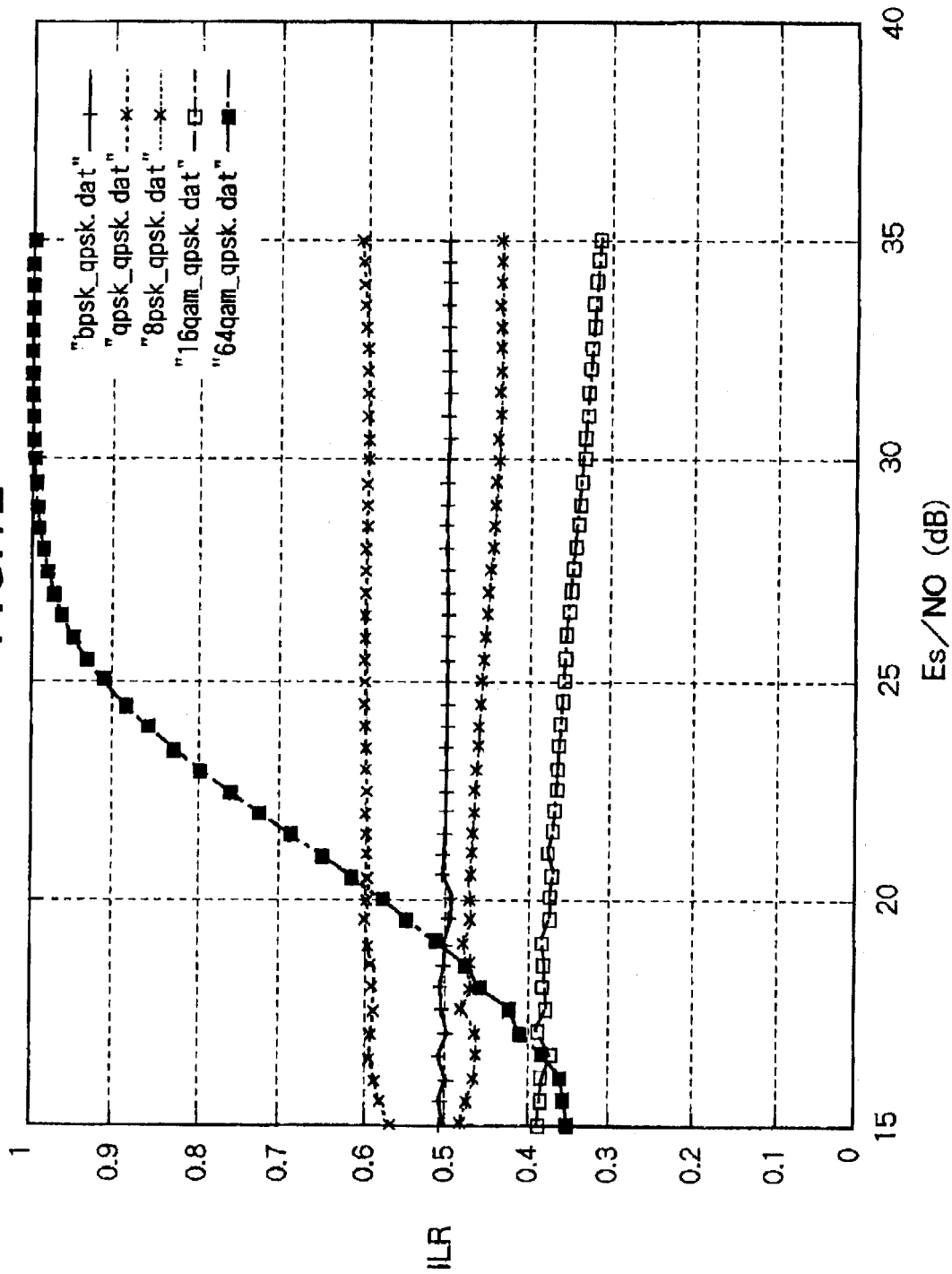
FIG. 12 is a view of the results of simulation of a phase lock detector for 64-QAM according to the present invention.

FIG. 7 is a view of the results of simulation of the phase lock detector group 12 and the results by evaluating equations (2) to (6).

In FIG. 7, an abscissa indicates Es/N0 indicating a SNR of the symbols, and an ordinate indicates the probability PL of a received symbol appearing in an in-lock area.

Further, points in this simulation are obtained from 10,000 ($10^4$) symbols transmitted through the ideal AWGN channel.

Further, FIG. 8, FIG. 9, FIG. 10, FIG. 11, and FIG. 12 show response results of the corresponding phase lock detectors 121 to 125 of BPSK, QPSK, 8PSK, 16-QAM, and 64-QAM.

In the figures, the abscissas indicate Es/N0 indicating the SNR of the symbols, and the ordinates indicates the in-lock area ratio (ILR).

This ILR is obtained as the number of symbols in the in-lock area divided by the total number of the received symbols.

It is seen from these results of simulation that the threshold value T given to the phase lock detectors 121 to 125 must be set at about 55 percent for both of M-PSK modulation and M-QAM modulation.

Further, FIG. 13 shows the minimum symbol SNR (Es/N0) required for reaching these threshold values.

As shown in FIG. 13, the minimum symbol SNR in the case of BPSK is −8.5, 1.0 in the case of QPSK, 7.0 in the case of 8PSK, 12.5 in the case of 16-QAM, and 20.0 in the case of 64-QAM.

Further, the simulation was similarly carried out for an identification circuit 14 for performing post-processing of the lock detection flags LDF121 to LDF125 obtained at the phase lock detectors 121 to 125.

FIG. 14 is a view of the results of simulation thereof.

In the simulation, $10^4$ symbols' worth of time was used for the counting period N and $5.5 \times 10^3$ was used for the threshold value T in both of M-PSK modulation and M-QAM modulation.

Note that the phase lock detectors 124 and 125 for 16-QAM and 64-QAM err in detection at a relatively low (Es/N0) in the case of QPSK modulation.

This is because the output of the QPSK use detector must be contained in the generation of the identification flags of 16-QAM modulation and 64-QAM modulation in the identification circuit 14.

This has the effect of enabling application in hierarchical modulation of the M-QAM signal as follows.

In simulation of detection of the QAM signal on the AWGN channel, the noise ratio of the mediation signal is relatively low, so QPSK modulation is erroneously detected.

Figure 15:
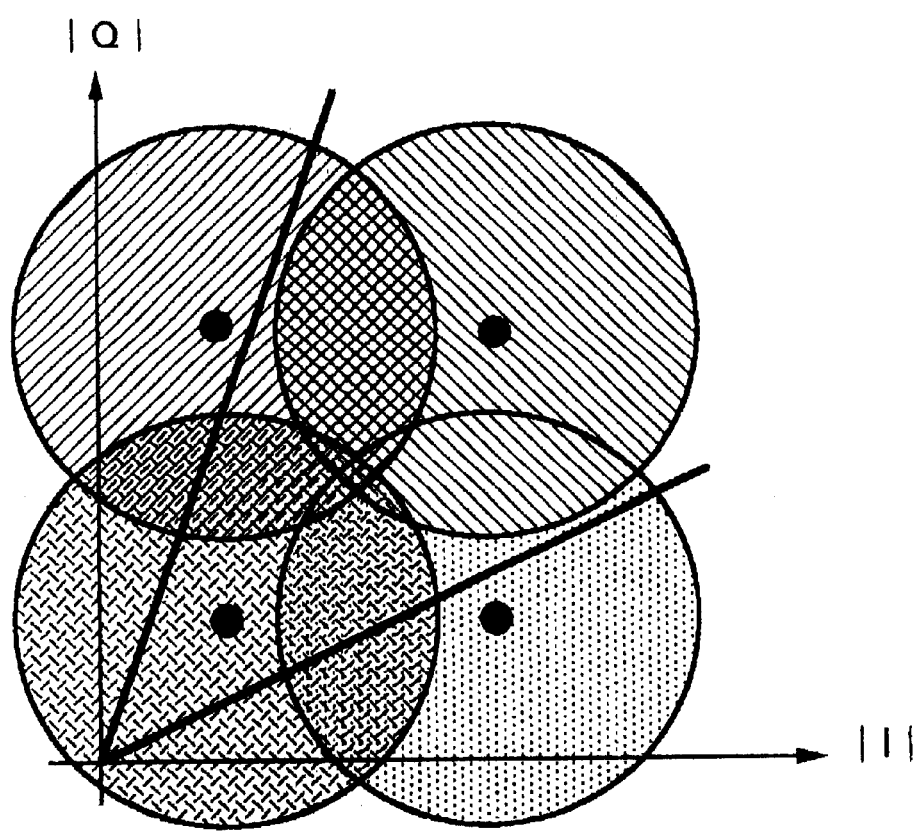
FIG. 15 is a view of the overlap of a noise sphere at reception of 16-QAM.

FIG. 15 is a view of the overlap of noise sphere in the reception of 16-QAM.

As shown in FIG. 15, most reception points are received in the in-lock area corresponding to the QPSK modulation.

Here, the "sphere" means the two-dimensional probability density function (PDF) of the received symbols centered around each transmitted symbol to within $\pm C\sigma_N$, where C is the predetermined constant, $\sigma_N = (N_0/2)^{1/2}$, and $N_0$ is the one-sided power spectral density of the AWGN process.

If the reception mode is set to QPSK modulation, at least 2 bits in each symbol related to the selection of the quadrant can be estimated in advance, and a high reliability can be obtained with respect to the remaining bits.

The present modulation format identification device 10 has the advantage of changing the counting period N and the threshold value T for the lock detection and identification of a specific digital modulation format in a digital communication system where the NSR of the channel changes.

In the results of simulation shown in FIG. 7 mentioned above, the PL of the ordinate is obtained by counting the number of symbols in the in-lock area and is given in the form of the $N_{HIT}$ given by the hit counter divided by the total number of symbols observed in the counting period ($PL \neq N_{HIT}/N$).

Further, the threshold value T is defined as $N_{HIT} > T$. When a hit count $N_{HIT}$ satisfying this relationship is obtained, that is, when a hit count $N_{HIT}$ larger than the threshold value T is obtained, the lock detection flag of the logic "1" is generated.

In general, on the receiver side, the channel condition cannot be seen, therefore the threshold value T is set at the lowest value, usually about a half 0.5N of the maximum count N, in actuality a value larger than that.

Based on the result of analysis mentioned above, on the ideal AWGN channel, 0.55N is suitable for all of M-PSK modulation and M-QAM modulation.

However, if reliable and timely information with a short delay in Es/N0 is valid on the receiver side, it is also possible to program these values of N and T in accordance with the channel condition.

This is derived from the fact that the average SNR does not quickly change with respect to the time taken for receiving several thousands of symbols.

In FIG. 7, it is seen that also the value of $N_{HIT}$ increases in some digital modulation formats by enhancing the channel condition and increasing the Es/N0.

For example, when the SNR range is changed from (Es/N0)=3 to (Es/N0)=10 (dB), PL in BPSK modulation increases from 0.85 to 1.0.

On the other hand, PL in QPSK modulation becomes 0.91 from 0.58.

When monitoring the range of this (Es/N0) on the receiver side, the threshold value $T_{BPSK}$ in the BPSK modulation can be set at 0.8N. At this time, the threshold value $T_{QPSK}$ of the QPSK modulation is 0.55N as it is.

When the channel condition is enhanced during a period from (Es/N0)=7 to (Es/N0)=13 (dB), the threshold value $T_{QPSK}$ of the QPSK modulation can increase to 0.8N.

Then, when the channel condition degrades to (Es/N0)=0, the threshold value of the BPSK modulation is lowered to $T_{BPSK}=0.55N$ at an initial stage.

In addition, the hit count $N_{HIT}$ per se can be used as a standard of the reliability of the received symbols. This is because, according to FIG. 7, $N_{HIT}$ (or PL) is a monotonic function of (Es/N0) over a relatively large range and saturates at N (or 1.0) at high values of SNR.

In other words, $N_{HIT}$ (or log ($N_{HIT}$)) can be used as a likelihood measure of the quality of the received symbols—a kind of "soft" lock detection.

Further, the present modulation format identification device 10 can be easily modified when trying to accommodate another digital modulation format.

For example, it is easy to modify it so as to be able to detect and identify 32-QAM modulation in addition to the five digital modulation formats explained in the present embodiment, that is, BPSK, QPSK, 8PSK, 16-QAM, and 64-QAM. In this case, it is configured as a modulation format identification device for the detection and identification of six modulation formats.

In this case, a 32-QAM use detector is added to the phase lock detector group 12, the analysis and simulation as mentioned above are carried out, and a logic circuit for exclusively identifying the 32-QAM modulation is added in the identification circuit.

As explained above, according to the present embodiment, provision is made of the phase lock detector group 12 having a plurality of detectors 121 to 125 provided corresponding to a plurality of modulation formats and with the received signal input in parallel thereto, counting the number of symbols in accordance with the modulation format for every detector, making a primary decision that the received signal has been modulated by a related modulation format when the count exceeds a constant threshold value, and outputting the result as the lock detection flags LDF121 to LDF125 and the logic circuit 14 for exclusively selecting one modulation format upon receipt of the plurality of output results LFD121 to LFD125 of the phase lock detector group 12, therefore a practical receiver capable of identifying the modulation format of the received signal irrespective of the modulation format can be realized by a simple configuration.

Further, the modulation format in accordance with the noise environment can be detected. In addition, modifications etc. can be easily made for the modulation format to be identified.

Accordingly, there is the advantage that a reception device optimum for an SDR for downloading software proposed in recent years can be realized.

Summarizing the effects of the invention, as explained above, according to the present invention, there is the advantage that a practical receiver capable of identifying the modulation format of the received signal irrespective of the modulation format can be realized by a simple configuration.

Further, the modulation format in accordance with the noise environment can be detected. In addition, modifications etc. can be easily made for the modulation format to be identified.

While the invention has been described with reference to specific embodiment chosen for purpose of illustration, it should be apparent that numerous modifications could be made thereto by those skilled in the art without departing from the basic concept and scope of the invention.

What is claimed is:

1. A modulation format identification device for identifying a modulation format of a received signal transmitted based on one modulation format among a plurality of different modulation formats, comprising a primary decision circuit having a plurality of detectors provided corresponding to said plurality of modulation formats and receiving as input received signals in parallel thereto, counting a number of symbols in accordance with each modulation format for every detector, making a primary decision that the received signal has been modulated by the related modulation format when a count exceeds a constant threshold value and outputting these decision results from the detectors and a logic circuit for exclusively selecting one modulation format upon receipt of a plurality of output results of said primary decision circuit.

2. A modulation format identification device as set forth in claim 1, wherein each detector comprises a hit counter for counting the number of symbols in each in-lock area designated in advance for exactly a counting period determined in advance and a detection flag generation circuit for comparing the count output from the hit counter and a threshold value set in advance and outputting a detection flag when the number of symbols is larger than the threshold value and said logic circuit selects one modulation format based on a plurality of detection flags from said detection flag generation circuit.

3. A modulation format identification device as set forth in claim 1, wherein said received signal is a signal capable of expressing an in-phase component and a quadrature component in an orthogonal coordinate system and having symmetry in the orthogonal coordinate system, and said primary decision circuit performs said primary decision based on the number of symbols in one quadrant among four quadrants of said quadrature coordinate system.

4. A modulation format identification device as set forth in claim 2, wherein said received signal is a signal capable of expressing an in-phase component and a quadrature component in an orthogonal coordinate system and having symmetry in the orthogonal coordinate system, and said primary decision circuit performs said primary decision based on the number of symbols in one quadrant among four quadrants of said quadrature coordinate system.

5. A modulation format identification device as set forth in claim 1, wherein substantially the same threshold value is used for said plurality of different modulation formats.

6. A modulation format identification device as set forth in claim 2, wherein substantially the same threshold value is used for said plurality of different modulation formats.

7. A modulation format identification device as set forth in claim 3, wherein substantially the same threshold value is used for said plurality of different modulation formats.

8. A modulation format identification device as set forth in claim 4, wherein substantially the same threshold value is used for said plurality of different modulation formats.

9. A modulation format identification device as set forth in claim 1, wherein said threshold value is set in accordance with the channel condition for every modulation format.

10. A modulation format identification device as set forth in claim 2, wherein said threshold value is set in accordance with the channel condition for every modulation format.

11. A modulation format identification device as set forth in claim 3, wherein said threshold value is set in accordance with the channel condition for every modulation format.

12. A modulation format identification device as set forth in claim 4, wherein said threshold value is set in accordance with the channel condition for every modulation format.

13. A modulation format identification method for identifying a modulation format of a received signal transmitted based on one modulation format among a plurality of different modulation formats, comprising the steps of counting the number of symbols in accordance with each modulation format and making a primary decision that the received signal has been modulated by the related modulation format when a count exceeds a constant threshold value and exclusively selecting one modulation format upon receipt of a plurality of primary decision results.

14. A modulation format identification method as set forth in claim 13, further comprising, in said primary decision, counting the number of the symbols in an in-lock area designated in advance for exactly a counting period determined in advance and deciding that a received signal has been modulated by the related modulation format when the count is larger than a threshold value set in advance.

15. A modulation format identification method as set forth in claim 13, wherein said received signal is a signal capable of expressing an in-phase component and a quadrature component in an orthogonal coordinate system and having symmetry in the orthogonal coordinate system, and said primary decision is made based on the number of symbols in one quadrant among four quadrants of said quadrature coordinate system.

16. A modulation format identification method as set forth in claim 14, wherein said received signal is a signal capable of expressing an in-phase component and a quadrature component in an orthogonal coordinate system and having symmetry in the orthogonal coordinate system, and said primary decision is made based on the number of symbols in one quadrant among four quadrants of said quadrature coordinate system.

17. A modulation format identification method as set forth in claim 13, wherein said threshold value is set in accordance with the channel condition for every modulation format.

18. A modulation format identification method as set forth in claim 14, wherein said threshold value is set in accordance with the channel condition for every modulation format.

19. A modulation format identification method as set forth in claim 15, wherein said threshold value is set in accordance with the channel condition for every modulation format.

20. A modulation format identification method as set forth in claim 16, wherein said threshold value is set in accordance with the channel condition for every modulation format.

* * * * *